Sept. 9, 1969 D. B. MONTGOMERY ET AL 3,466,579

HIGH SPEED SWITCHING DEVICES

Filed Aug. 19, 1966 2 Sheets-Sheet 1

INVENTORS
NORTON T. PIERCE
DONALD B. MONTGOMERY
THOMAS COOCH
BY ROBERT F. O'CONNELL
ATTORNEYS

INVENTORS
NORTON T. PIERCE
DONALD B. MONTGOMERY
THOMAS COOCH
ROBERT F. O'CONNELL
BY
ATTORNEYS

United States Patent Office 3,466,579
Patented Sept. 9, 1969

3,466,579
HIGH SPEED SWITCHING DEVICES

Donald B. Montgomery, Wayland, and Norton T. Pierce, Concord, Mass., assignors to Massachusetts Institute of Technology, Cambridge, Mass., a corporation of Massachusetts Filed Aug. 19, 1966, Ser. No. 573,642
Int. Cl. H01h 9/30
U.S. Cl. 335—201 4 Claims

ABSTRACT OF THE DISCLOSURE

A high speed switching device which uses insulative layers substantially enclosing a pair of conductive members so as to expose only a contact area thereof and a third movable insulative layer slidably supported therebetween. The movable layer has a conductive element positioned in a single opening thereof so that such sliding layer can be moved extremely rapidly between a first position where the conductive element is in contact with the exposed contact areas of the conductive members and a second position where the contact element is in contact with the first and second insulative layers and completely removed from contact with the exposed contact areas of such conductive members.

This invention relates to switching devices generally and, more particularly, to a high speed switching device for making or breaking a circuit in an extremely short period of time, which device is useful as a protective circuit interrupter or as a switching device for alternately connecting and disconnecting a circuit at a relatively rapid rate.

In one specific application of the switching device of this invention, for example, the device is capable of protecting a circuit containing an inductive load, such as the coil of a superconductive electromagnet, as a part of an overall system for rapidly reducing the current while maintaining the voltage across such coil below a specified value. In order to assure that no damage results to the load when the superconductor becomes resistive, for example, it is necessary to provide a circuit interrupter which reduces the current through the load circuit to zero in an extremely short time interval. To do this, the switching, or circuit-breaking, mechanism of the invention is utilized so that the overall operation is extremely fast and no damaging arc is produced as the circuit is broken.

This invention provides high speed action by utilizing a slidable switching element having a relatively small mass, which is easily and rapidly moved during the switching operation. This invention recognizes that the current between a pair of relatively large conductive members may be conducted through a bridging, or contact, element the cross-sectional area of which is relatively small with respect to the cross-sectional area of the conductive members. Because of this fact, the circuit interrupter device may be fabricated so as to have a relatively small mass in comparison to the mass of the conductive members with which it is in contact so that its contact element is very small even though relatively high currents must be carried by such element. Hence, extremely fast action can be achieved. In addition, the relatively small movable contact element and the portions of the conducting members which it contacts are arranged so that they are substantially enclosed in insulative material.

Because of the presence of such insulation and because of the extremely fast action which is obtainable by the use of such a small mass, little or no chance occurs for an arc to be produced when the circuit is broken. Hence, no elaborate arc-snuffing materials, devices or configurations are required to prevent damage to the elements of the switch as in previous circuit interrupting systems.

In one particular embodiment of the invention, for example, the contact element which bridges the conductive members of a circuit is positioned within a slidably mounted insulative layer which moves between a pair of additional fixed insulative layers having openings through which are inserted contact portions of the conductive members of a circuit which is to be either completed or broken, depending on whether the switch is in a closed or open position. As described in more detail in later paragraphs, when the contact element is positioned so as to come into electrical contact with, and thereby bridge, the contact portions of the conductive members of the circuit, the circuit is closed and the current flows therethrough. When it is desired to break the circuit, for protective reasons or other purposes, the slidable insulation layer containing the bridging, or contact, element is rapidly moved from its conductive, or contact, position to a position in which the contact element is completely removed from the contact portions of the conductive members of the circuit. As the contact element is slidably moved from its conductive to its non-conductive position, the space between the contact portions of the conductive members is substantially completely filled with insulative material almost instantaneously and, consequently, no arc is allowed to form.

Rapid motion of the slidable, insulative layer containing the contact element is achieved in one embodiment by attaching one end of said layer to the plunger of a fast-acting solenoid which is actuated by a suitable capacitor-discharge circuit described in more detail in later paragraphs.

The structure and the operation of one particular embodiment of this invention is discussed more completely with reference to the accompanying drawing in which.

Figure 1:
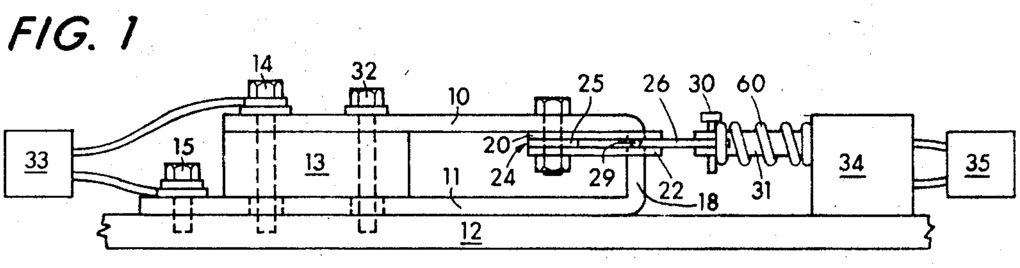
FIG. 1 shows a side elevational view of one particular embodiment of the invention.
Figure 2:
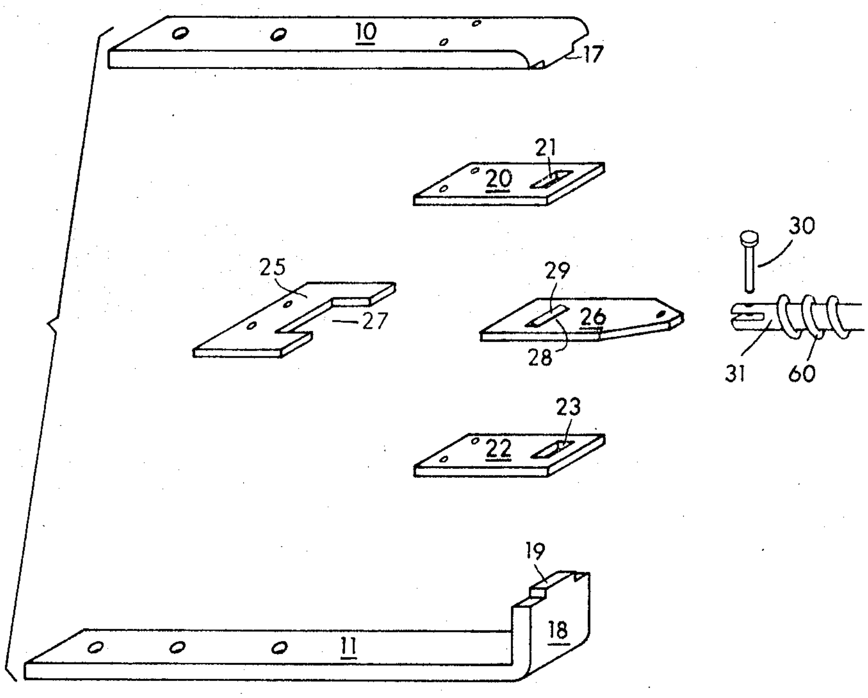
FIG. 2 shows an exploded, perspective view of the switching element of the embodiment of the invention shown in FIG. 1.

In FIGS. 1 and 2 a pair of conductive members 10 and 11 are fixedly mounted to an insulative base 12 on either side of an insulative spacer 13 by means of a screw 32. A terminal member 14 connected to upper conductive member 10 is connected to one side of an appropriate load 33 which may be, for example, a superconductive coil of an electromagnet. A second terminal member 15 connected to lower conductive member 11 is connected to the other side of load 33. Conductive member 10 has a projection 17 which in a preferred embodiment of the invention may be coated with a highly conductive material, such as silver, on its lower surface. Lower conductive member 11 has an upwardly projecting leg 18 having a projection 19 which in a preferred embodiment may also be coated on its upper surface with a suitable highly conductive material, such as silver.

A first fixedly mounted insulative layer 20 has an opening 21 therein through which projection 17 of conductive member 10 is inserted. A second fixedly-mounted insulative layer 22 has an opening 23 therein through which projection 19 of conductive member 11 is inserted. In each case projections 17 and 19 are laterally enclosed by insulation. A central insulative layer 24 is positioned between upper insulative layer 20 and lower insulative layer 22 and has a first fixed portion 25 and a second slidable portion 26. Fixed insulative portion 25 has an opening 27 which forms a channel in which slidable insulative portion 26 is guided during its sliding motion. Slidable portion 26 has an elongated opening 28 therein in which is positioned a contact element 29 which in the preferred embodiment shown may be a copper cylinder having a highly conductive coating of silver thereon. In this particular embodiment, contact element 29 is free to rotate within opening 28 as portion 26 slides between fixed insulative portions 20 and 22.

A plunger 31 of a solenoid 34 is suitably attached to one end of slidable insulative portion 26. In the particular embodiment shown, the end of the plunger is slotted so as to engage the end of slidable insulative portion 26 and is fastened thereto by means of pin 30. Thus, when solenoid 34 is actuated plunger 31 moves from left to right in a linear motion and slidable insulative element 26 likewise is moved in channel 27 between insulative layers 20 and 22 to break the circuit. Solenoid 34 is connected to a control circuit shown schematically as block 35 in FIG. 1 which operates to energize the coil of solenoid 34 to cause movement of plunger 31 as desired. When the coil is de-energized, plunger 31 is free to move from right to left under the operation of spring 60 so that slidable insulative element 26 is automatically returned to its previous position to complete the circuit once again.

Figure 3:
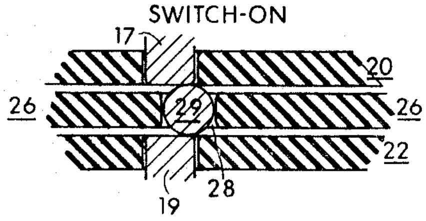
FIG. 3 shows a view in cross-section of a portion of the embodiment shown in FIG. 1 when the switching device thereof is in a closed, or conductive, position.
Figure 4:
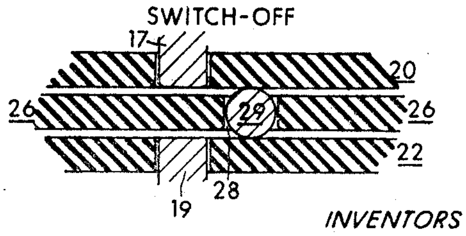
FIG. 4 shows a view in cross-section of a portion of the embodiment shown in FIG. 1 when the switching device thereof is in an open, or non-conductive, position.
Figure 5:
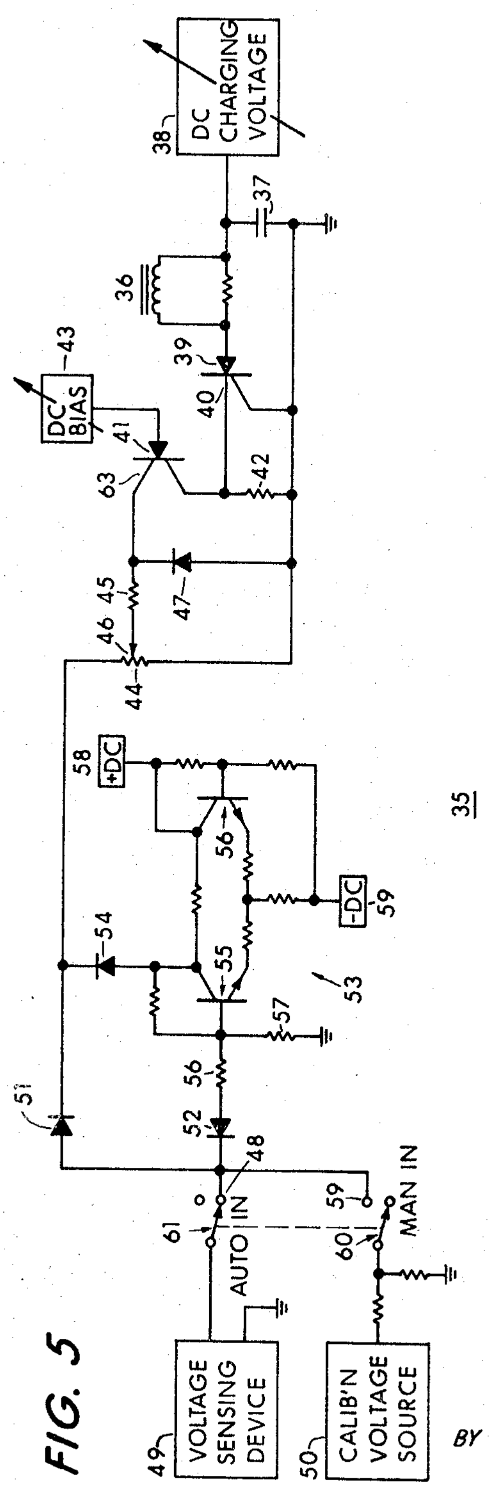
FIG. 5 shows a schematic diagram of one particular embodiment of a circuit used to actuate the solenoid shown in FIG. 1 in order to operate the switching device shown in FIG. 2.

The operation of control circuit 35, as described more completely in subsequent paragraphs with reference to FIG. 5, causes solenoid 34 to be actuated so that its plunger moves rapidly from left to right, as shown in FIGS. 1 and 2, from a first, conductive, or "Switch On," position as shown in FIG. 3 to a second, non-conductive, or "Switch Off," position as shown in FIG. 4. In the former figure, contact element 29 is positioned between and in contact with projections 17 and 19 and completes the circuit from conductive member 10 to conductive member 11. In the latter figure, contact element 29 has been completely removed from its first conductive position between projections 17 and 19 and the space between said projections is now substantially completely filled with insulative material represented by the left-hand or trailing, portion of slidable insulative element 26. Because of the configuration of the switch element shown and because of the extremely rapid motion of slidable insulative element 26 from its "Switch On" to its "Switch Off" position, it has been found that substantially no arc forms in the space between conductive projections 17 and 19. It is believed that the avoidance of an arc by this structure can be most reasonably explained as follows.

When the circuit is broken, a conductive path, comprising copper and/or silver ions released from the surfaces of conductive projections 17 and 19 and contact element 29, tends to be formed between said projections, thereby providing a current path therebetween. Such a path cannot be immediately formed and a finite time is required to allow the ions to migrate from such elements into the space therebetween. However, since the space directly between said projections is substantially instantaneously filled with insulative material, no such path can be formed directly across the gap between the projections. Under such conditions the only path which has an opportunity to form is one extending from the lower surface of projection 17, through the minute gap formed by the adjacent surfaces of insulative portion 26 and insulative member 20, through opening 28 of insulative portion 26 and, thence, along the minute gap formed by insulative portion 26 and lower insulative member 22 to the upper surface of projection 19. As slidable insulative portion 26 moves to the right such path becomes progressively longer.

It is believed that, since the path reaches its maximum length in an extremely short time due to the fast action of the switching device and since the gaps between insulative portion 26 and insulative members 20 and 22 are exceptionally small (in one particular embodiment such gaps have been made less than .002 inch) a conductive path of copper and/or silver ions has no chance to form and, hence, any tendency to form an arc is rapidly snuffed out. Damage to the contact element of the switch or to projections 17 and 19 has been found to be insignificant when using this invention and the switch may be operated continuously for long periods without causing any appreciable erosion of its elements.

The operation of control circuit 35 for actuating solenoid 34 may be described more completely with reference to FIG. 5. In that figure there is shown a triggering circuit 35 which will cause a current to flow through the coil 36 of solenoid 34 due to the discharge of condenser 37 which has been charged up to its maximum charging voltage by means of a DC charging voltage supply 38. Condenser 37 will discharge through coil 36 only if silicon control rectifier 39 is conducting.

Conduction of silicon control rectifier 39 is controlled by the voltage applied at its gate electrode 40 which is in turn controlled by the operation of a second silicon control rectifier 41 which determines the voltage across resistor 42, connected to the gate of silicon control rectifier 39. The operation of silicon control rectifier 41 is in turn determined by the voltage supplied by DC bias voltage supply 43 and the voltage applied at its gate electrode 63 from the variable contact of variable resistor 44 through resistor 45. As long as the voltage at variable contact 46 is below a specified value, silicon control rectifier 41 remains non-conductive. When the voltage at contact 46 is above a specified value, silicon control rectifier 41 conducts thereby causing current to flow through resistor 42 so that an appropriate gating voltage is applied to silicon control rectifier 39 to cause it to become conductive and thereby provide a discharge path for condenser 37 through solenoid coil 36 to ground. The current flowing through coil 36 thereby causes its plunger 31 to move rapidly to the right, as shown in FIGS. 1 and 2, so that the switching element is substantially instantaneously moved to its "Switch Off" position, as indicated in FIG. 4.

The voltage at variable contact 46 is determined by the voltage across variable resistor 44 and in turn depends upon the input voltage applied at input terminal 48, designated as "AUTO. IN." Such input voltage is determined by an appropriate voltage sensing device 49 which automatically and continuously measures the voltage across a particular load such as, for example, the load 33 of FIG. 1.

In order to maintain the voltage across such a load at a level between maximum positive and maximum negative limits, it is necessary that control circuit 35 be actuated when such voltage exceeds such limits in either the positive or negative direction. In order to provide such operation an appropriate voltage is applied to variable resistor 44 via rectifier 51 which is directly connected between the input terminal 48 and one end of variable resistor 44 when a positive voltage is being monitored.

In the case where a negative voltage is monitored an appropriate voltage is applied to variable resistor 44 through rectifier 52, its associated transistor circuit 53 and rectifier 54. In such circuit a first transistor 55 has its base electrode connected to rectifier 52 via a voltage divider comprising resistors 56 and 57. A bias voltage is supplied to transistor 55 via positive and negative DC sources 58 and 59 connected thereto in conjunction with a second transistor 56.

Thus, whether the monitored input signal from the load is positive or negative, condenser 37 can be triggered to discharge through coil 36 of solenoid 34 when such input voltage exceeds specified reset levels. The control of such triggering may be accomplished by an appropriate adjustment of variable resistor 44, DC bias source 43 and DC charging source 38.

In order to calibrate the circuit, a manually controlled input signal from a calibration voltage source 50 may be applied at input terminal 59 (designated as "MAN. IN") through a suitable voltage divider as shown. To apply either the automatically monitored signal from the load or the manually applied calibration signal, ganged switches 60 and 61 can be used.

The circuit configuration of FIG. 5 shows only one example of the way in which the fast acting switch of the invention can be actuated. Many alternative applications and methods of operating the switch may be envisioned by those skilled in the art so that the switch may be closed under particular conditions and opened under other conditions. For example, the switch may be alternately opened and closed to provide rapid on-off action by selecting other known control circuits to operate the solenoid plunger in a relatively high-speed oscillating manner. Hence, the particular embodiment of the invention shown and discussed herein is not meant to limit the scope of the invention in any manner except as defined by the appended claims.

What is claimed is:

1. A high speed switching device comprising, in combination, first and second spaced relatively massive conductive members, insulator means having openings to receive facing contact portions of the conductive members, the insulator means substantially enclosing the contact portions so as to expose only a contact area of each, an insulative layer slidably supported in a channel in the insulator means between the contact areas of the conductive members and having a transverse aperture therethrough, a rotatable contact element positioned in said aperture, high speed means secured to the insulative layer to slide the layer between a first position wherein the contact element is positioned between and in electrical contact with said portions of said conductive members and a second position wherein the contact element is removed from any contact with said contact portions of said conductive members, the cross-sectional area of contact between said rotatable element and said conductive members in said first position being substantially less than the cross-sectional area of said conductive members to provide low-resistance contact therebetween and the cross-sectional area of the contact element being relatively small with respect to the cross-sectional area of the conductive members to provide a slidable portion that has a small mass relative to the mass of the conductive members.

2. A high speed switching device as claimed in claim 1 in which the insulative layer substantially fills the gap between said contact portions in said second position.

3. A high speed switching device as claimed in claim 2 in which the means secured to the insulative layer is a solenoid responsive to a signal from a sensing means to break the circuit to a load when the signal exceeds specified limits.

4. A high speed switching device for making and breaking a circuit between two conductive members comprising:

first and second spaced relatively massive conductive members;

a first insulative layer having an opening for inserting therein a contact portion of the first conductive member, said first insulative layer substantially enclosing the contact portion so as to expose only a contact area thereof;

a second insulative layer having an opening for inserting therein a contact portion of the second conductive member, said second insulative layer substantially enclosing the contact portion of the second conductive member so as to expose only a contact area thereof;

a third insulative layer slidably supported between said first and said second insulative layers and having a transverse aperture therethrough, a roller contact element being positioned in said aperture;

solenoid means for sliding the slidable third layer between a first position wherein the contact element is positioned between and in electrical contact with the contact portions of said conductive members and a second position wherein the contact element is removed from any contact with said contact portions of said conductive members, the third insulative layer being disposed in the space between said conductive members in said second position, the cross-sectional area of contact between said roller and said conductive members in said first position being substantially less than the cross-sectional area of said conductive members to provide low-resistance contact therebetween and the cross-sectional area of the contact element being relatively small with respect to the cross-sectional area of the conductive members thereby to provide a slidable portion including the contact member and the third insulative layer that is substantially less than the mass of the conductive members;

means for triggering said solenoid means so that said slidable portion moves between the first position wherein the contact element is in electrical contact with said contact portions and the second position wherein the contact element is completely removed from contact with said contact portions; and sensing means for monitoring at least one of a voltage signal and a current signal to a load, the triggering means being responsive to the monitored signal for actuating said solenoid means to break the load circuit when said monitored signal exceeds specified limits.

References Cited

UNITED STATES PATENTS

| | | | |
|---|---|---|---|
| 3,129,307 | 4/1964 | De Vargas | 200—151 XR |
| 2,197,868 | 4/1940 | Knowlton | 317—31 |
| 1,894,543 | 1/1933 | Rowe. | |
| 1,889,515 | 11/1932 | Hammerly. | |
| 2,116,673 | 5/1938 | Fisher et al. | 200—149 |
| 2,492,101 | 12/1949 | Landmeier | 200—163 |
| 3,064,165 | 11/1962 | Kennedy | 317—148.5 |
| 3,097,281 | 7/1963 | Brown et al. | |
| 3,168,627 | 2/1965 | Gilley. | |

BERNARD A. GILHEANY, Primary Examiner

D. M. MORGAN, Assistant Examiner

U.S. Cl. X.R.

200—166; 335—209, 219